US006401009B1

(12) United States Patent
Chandonnet

(10) Patent No.: US 6,401,009 B1
(45) Date of Patent: Jun. 4, 2002

(54) SUNDRY ARTICLE VENDING APPARATUS

(76) Inventor: Suzette M. Chandonnet, 914 A Crain St., Apt. 1N, Evanston, IL (US) 60202

( * ) Notice: Subject to any disclaimer, the term of this patent is extended or adjusted under 35 U.S.C. 154(b) by 0 days.

(21) Appl. No.: 09/250,194

(22) Filed: Feb. 16, 1999

(51) Int. Cl.[7] ................................................ G06F 17/00

(52) U.S. Cl. .......................... 700/231; 700/232; 221/2; 221/5

(58) Field of Search ............................... 221/2, 4, 5, 7; 194/217; 700/231, 232, 241

(56) References Cited

U.S. PATENT DOCUMENTS

| | | | | |
|---|---|---|---|---|
| 564,427 | A | 7/1896 | Jacques | |
| 1,249,221 | A | 12/1917 | Skeen | |
| 1,412,780 | A | 4/1922 | Fritsche et al. | |
| 1,496,307 | A | 6/1924 | Emison | |
| 1,714,122 | A | 5/1929 | Barks | |
| 1,893,843 | A | 1/1933 | Milestone | |
| 2,021,544 | A | 11/1935 | Crown | 221/67 |
| 2,049,025 | A | 7/1936 | Rosebrook | 221/99 |
| 2,320,159 | A | 5/1943 | Smith | 221/69 |
| 2,432,455 | A | 12/1947 | Smith | 312/193 |
| 2,781,949 | A | 2/1957 | Stoneburner | 222/27 |
| 3,187,939 | A | 6/1965 | Hayes | 221/4 |
| 3,193,139 | A | 7/1965 | Iannone et al. | 221/224 |
| 3,794,148 | A | 2/1974 | Copp | 194/4 |
| 3,877,241 | A | 4/1975 | Wade | 62/137 |
| D256,242 | S | 8/1980 | Small | D15/9.1 |
| 4,263,945 | A | 4/1981 | Van Ness | 141/98 |
| 4,271,981 | A | 6/1981 | Bennett | 222/32 |
| 4,284,370 | A | 8/1981 | Danler et al. | 406/86 |
| 4,327,940 | A | 5/1982 | Sessions | 283/21 |
| 4,421,248 | A | 12/1983 | Porcina | 222/25 |
| 4,465,209 | A | 8/1984 | Wilder | 222/23 |
| D301,147 | S | 5/1989 | Bass | D15/9.1 |
| D302,820 | S | 8/1989 | Bass | D15/9.2 |
| 5,044,520 | A | 9/1991 | Moisan | 222/2 |
| 5,354,152 | A | 10/1994 | Reinhardt et al. | 406/3 |
| 5,586,686 | A | 12/1996 | Bustos et al. | 221/211 |
| 5,602,745 | A | 2/1997 | Atchley et al. | 364/464.23 |
| 5,641,050 | A * | 6/1997 | Smith et al. | 194/217 X |
| 5,704,517 | A | 1/1998 | Lancaster, Jr. | 222/2 |
| 5,725,124 | A | 3/1998 | Bustos et al. | 221/211 |
| 6,193,154 | B1 * | 2/2001 | Phillips et al. | 235/381 |

FOREIGN PATENT DOCUMENTS

| | | | |
|---|---|---|---|
| DE | 255 14 442 | 10/1976 | |
| GB | 2 173 476 | 10/1986 | 13/6 |
| JP | 56-3229 | 1/1981 | 53/58 |
| JP | 2-202694 | 8/1990 | G07F/11/00 |

* cited by examiner

*Primary Examiner*—Christopher P. Ellis
*Assistant Examiner*—Gene O. Crawford
(74) *Attorney, Agent, or Firm*—Dick and Harris

(57) ABSTRACT

A sundry article vending apparatus, in structural and functional cooperation with a fully automatic vehicle-related product and/or service providing apparatus, for the on-site storage and vending of sundry articles, wherein the payment for the sundry articles may be accomplished through cash payment to a cash box integrated into the structure of the product and/or service providing apparatus, or through an on-line banking or payment facility, using the keypad, card reader and banking or billing system for the product and/or service providing apparatus. The vehicle-related product/service vending device may be a service station fuel pump, an automated or self-service car wash device,.or a compressed air vending device, among other vehicle-related vending devices.

32 Claims, 3 Drawing Sheets

SUNDRY ARTICLE VENDING APPARATUS

CROSS-REFERENCES TO RELATED APPLICATIONS

Not Applicable

STATEMENT REGARDING FEDERALLY SPONSORED RESEARCH OR DEVELOPMENT

Not Applicable

REFERENCE TO A "MICROFICHE APPENDIX"

Not Applicable

BACKGROUND OF THE INVENTION

1. Field of the Invention

The present invention relates to vending apparatuses and methods, in particular those vending apparatuses and methods relating to the automated provision of products and/or services for vehicles, such as automated service station fuel pumps, automated and/or self-service car wash installations, compressed air machines (e.g. for tires), etc.

2. Description of the Related Art Including Information Disclosed Under 37 CFR 1.97 and 1.98

Modern service stations ("gas stations") are typically provided with electronically operated fuel pumps, which incorporate a keypad, a slot for receiving a credit card, debit card or the like, and suitable electronics, programming and telephonic connections, so that an individual may approach a pump, activate it using the credit or debit card, and pump and pay for fuel, without ever having to leave the side of the vehicle.

Such systems are capable of connecting, via appropriate computers and phone lines, to the data base(s) for the customer's credit card, debit card or the like, so that confirmation can be obtained that the transaction will be paid for. Thus, upon receiving such confirmation, the control system for the pump itself, will recognize and authorize the proposed transaction, and actuate the pump, so that it can be operated by the customer. After the pumping is completed, the final amount of the transaction is then charged or debited against the credit or debit card, and a receipt is offered to the customer for their records.

Because of the convenience of such pumping systems, often the customer does not enter the station enclosure, which is typically filled with other merchandise, such as food, beverages, automotive supplies, etc. Thus, the convenience of the electronic, credit-card operated pump represents lost merchandising opportunities for the station owner.

Some efforts have been made, in the past, to integrate other merchandising activities, into the structure and operation of a service station pump.

Hayes, U.S. Pat. No. 3,187,939, for example, discloses a coin operated gas pump, which is physically combined with a vending machine (also coin-op) for canned gasoline. The canned gasoline is stored in the housing at the site of the pump.

Bustos et al., U.S. Pat. Nos. 5,586,686 and 5,725,124, are directed to a temperature maintained food dispensing system and method, and a product vending and pneumatic delivery system and method, respectively. These references are directed to service station pump-site vending systems, in which the vended goods are stored, prior to vending, in a storage facility (temperature controlled, in particular) situated within the service station structure proper. A pneumatic tube conveyor moves the product from storage to a dispensing unit at the remote location in response to product selection made by a customer at the remote location. Payment for the sale of the product item is coordinated with information from another vending or accounting system such as a gasoline charge system, that includes a credit card reader associated with a fully automated self-service gasoline pump, and is connected to an on-line banking or billing system.

The Bustos et al. '686 and '124 references, however, are, crucially, focused upon transportation systems for delivery of the vended goods to a remote location, from a centralized storage system. In addition, the Bustos et al. references are also solely directed to payment, at such remote locations, such as pump-site, via on-line billing systems, and are not capable of engaging in cash transactions at the pump-site.

The desirability of vending products at the pump-site is exemplified by the recurring problem that often customers are filling up on gas on the way to work or to appointments, in what may be time-critical situations, only to find themselves, as a result of the filling-up process, with hands contaminated by fuel and/or fuel odors. The plain paper towels typically dispensed from the pylons or light stands next to the pumps simply are inadequate to alleviate this problem, and in any event, such dispensers are more often than not, empty. Thus, there is a ready and available market for the vending, at reasonable cost, of towelettes, which may be moistened or scented, or Which carry antibacterial treatments, at the pump-site, to alleviate this problem of hands contaminated with chemicals or odors, on the spot without having to leave the pump-site.

It would be desirable to provide a service station pump-site sundry article vending apparatus and system, which is directed to the vending of sundry articles more immediately relevant to the purchase of fuel and the process of filling a vehicle fuel tank, such as the vending of towelettes, oil and other automotive fluids, and the like.

It would also be desirable to provide a service station pump-site sundry article vending apparatus and system, which is configured for storage of the vended sundry articles at the pump-site, without the need for complicated transport systems for moving the sundry articles from a centralized storage facility to a remote location.

It would still further be desirable to provide a service station pump-site vending apparatus and system, which is configured to be enable payment through either cash transactions, or through on-line banking and billing systems.

It would be additionally desirable, to provide the vending of sundry articles at other vehicle-related automated and/or self-service product or service facilities, such as car washes, compressed air dispensers and the like.

BRIEF SUMMARY OF THE INVENTION

The invention is directed, in part, to a sundry article vending apparatus, for the facilitated display and vending of at least one type of sundry article, other than fuel, at the location of a device for the vending of a vehicle-related product and/or service, to enable a purchaser to complete a purchase transaction of at least one of the sundry articles, at said vehicle-related product/service vending device, wherein the vehicle-related product/service vending device is provided with a keypad, an alphanumeric display, a card reader, and a vehicle-related product/service vending control device having suitable connections to an automated billing system.

The sundry article vending apparatus comprises a storage device, capable of cooperative physical connection to a vehicle-related product/service device housing, and adjacent said housing. The storage device is operably configured to contain a quantity of at least one type of sundry articles. A dispensing mechanism is operably configured, upon actuation, for delivering at least one of said sundry articles from the storage device to a dispensing aperture. A sundry article vending control device is operably connected to the dispensing mechanism, and further operably connectable to a vehicle-related product/service vending control device.

The sundry article vending control device is operably configured, upon connection to a vehicle-related product/service vending control device, to receive order instructions from a purchaser, entered by keystrokes on the keypad of the vehicle-related product/service vending device.

The sundry article vending control device is further operably configured, upon connection to a vehicle-related product/service vending control device, to accept payment for the purchase of at least one sundry article, through the passing of an indicia bearing payment card through the card reader and to actuate the dispensing mechanism in response thereto.

A cash box mechanism is operably connected to the sundry article vending control device, for enabling a purchaser to alternatively complete a purchase of at least one sundry article using cash.

The vehicle-related product/service vending device is preferably one selected from the group consisting of a service station fuel pump, a self-service car wash control device, or a compressed air dispenser.

The cash box mechanism is preferably configured to be operated by one of the group consisting of coins, bills, or coins and bills.

The at least one type of sundry article is preferably selected from the group consisting of towelettes, air gauges, gloves, tissues, or fuel additives.

The at least one type of sundry article may comprise a towelette, moistened with at least one agent selected from the group consisting of a cleaning agent, a deodorizing and/or scenting agent, or an antibacterial agent. Alternatively, the at least one type of sundry article may be one selected from the group consisting of vehicle-related non-fuel goods, or non-vehicle-related goods.

The invention is also directed to a combination vehicle-related product/service vending device and integrated sundry article vending apparatus, for the facilitated display and vending of at least one type of sundry articles other than fuel, to enable a purchaser to complete a purchase transaction of at least one of the sundry articles, at the site of the vehicle-related product/service vending device.

The combination vehicle-related product/service vending device and integrated sundry article vending apparatus comprises a housing. A device is disposed within the housing for providing a vehicle-related product/service, including a keypad, an alphanumeric display, a card reader, and a vehicle-related product/service vending control device having suitable connections to an automated billing system.

A storage device is disposed within the housing, and operably configured to contain a quantity of at least one type of sundry articles. A sundry article dispensing mechanism is operably configured, upon actuation, for delivering at least one of said sundry articles from the storage device to a dispensing aperture.

A sundry article vending control device is operably connected to the sundry article dispensing mechanism, and further operably connected to the vehicle-related product/service vending control device. The sundry article vending control device is operably configured, to receive order instructions from a purchaser, entered by keystrokes on the keypad of the vehicle-related product/service vending device. The sundry article vending control device is further operably configured to accept payment for the purchase of at least one sundry article, through the passing of an indicia bearing payment card through the card reader, and to actuate the dispensing mechanism in response thereto.

A cash box mechanism is operably connected to the sundry article vending control device, for enabling a purchaser to alternatively complete a purchase of at least one sundry article using cash.

In the combination, the vehicle-related product/service vending device is preferably one selected from the group consisting of a service station fuel pump, a self-service car wash control device, or a compressed air dispenser. The cash box mechanism preferably is configured to be operated by one of the group consisting of coins, bills, or coins and bills. Preferably, the at least one type of sundry article is selected from the group consisting of towelettes, air gauges, gloves, tissues, or fuel additives. Alternatively, the at least one type of sundry article may comprise a towelette, moistened with at least one agent selected from the group consisting of a cleaning agent, a deodorizing and/or scenting agent, or an antibacterial agent. Still further alternatively, the at least one type of sundry article may be one selected from the group consisting of vehicle-related non-fuel goods, non-vehicle-related goods.

The invention also comprises a method of vending sundry articles other than fuel from a vehicle-related product/service vending device, comprising the steps of:

providing a sundry article vending apparatus, for the facilitated display and vending of at least one type of sundry articles other than fuel, at a vehicle-related product/service vending device, to enable a purchaser to complete a purchase transaction of at least one of the sundry articles, at the vehicle-related product/service vending device, wherein the vehicle-related product/service vending device is provided with a keypad, an alphanumeric display, a card reader, and a vehicle-related product/service vending control device having suitable connections to an automated billing system, the step of providing a sundry article vending apparatus further comprising the steps of:

providing a storage device, capable of cooperative physical connection to a vehicle-related product/service vending device housing and adjacent said housing, operably configuring the storage device to contain a quantity of at least one type of sundry articles;

providing and operably configuring a dispensing mechanism to, upon actuation, deliver at least one of said sundry articles from the storage device to a dispensing aperture;

providing and operably connecting a sundry article vending control device to the dispensing mechanism, and further operably connecting the sundry article vending control device to a vehicle-related product/service vending control device, operably configuring the sundry article vending control device, upon connection to a vehicle-related product/service vending control device, to receive order instructions from a purchaser, entered by keystrokes on the keypad of the vehicle-related product/service vending device, further operably configuring the sundry article vending control device, upon connection to a vehicle-related product/service vending control device, to accept payment for the purchase of at least one sundry article, through the passing of an indicia bearing payment card through the card reader and to actuate the dispensing mechanism in response thereto; and providing and operably connecting a cash box mechanism, to the sundry article vending control device, for enabling a purchaser to alternatively complete a purchase of at least one sundry article using cash.

In the method, the vehicle-related product/service vending device preferably is one selected from the group consisting of a service station fuel pump, a self-service car wash control device, or a compressed air dispenser. The cash box mechanism is preferably configured to be operated by one of the group consisting of coins, bills, or coins and bills. The at least one type of sundry article preferably is selected from the group consisting of towelettes, air gauges, gloves, tissues, or fuel additives. The at least one type of sundry article may alternatively comprise a towelette, moistened with at least one agent selected from the group consisting of a cleaning agent, a deodorizing and/or scenting agent, or an antibacterial agent. Still further alternatively, the at least one type of sundry article may be one selected from the group consisting of vehicle-related non-fuel goods or non-vehicle-related goods.

The invention is further directed to a method for vending sundry articles other than fuel from a combination vehicle-related product/service vending device and integrated sundry article vending apparatus, for the facilitated display and vending of at least one type of sundry articles other than fuel, to enable a purchaser to complete a purchase transaction of at least one of the sundry articles, at the vehicle-related product/service vending device.

The method of vending sundry articles from a combination vehicle-related product/service vending device and integrated sundry article vending apparatus preferably comprises the steps of:

providing a housing;

disposing a vehicle-related product/service vending mechanism within the housing;

disposing a keypad, an alphanumeric display, a card reader, and a vehicle-related product/service vending control device having suitable connections to an automated billing system, within the housing;

disposing a storage device within the housing, and operably configuring the storage device to contain a quantity of at least one type of sundry articles;

operably configuring a sundry article dispensing mechanism to, upon actuation, deliver at least one of said sundry articles from the storage device to a dispensing aperture;

operably connecting a sundry article vending control device to the sundry article dispensing mechanism, and further operably connecting the sundry article vending control device to the vehicle-related product/service vending control device, operably configuring the sundry article vending control device to receive order instructions from a purchaser, entered by keystrokes on the keypad of the vehicle-related product/service vending device, further operably configuring the sundry article vending control device to accept payment for the purchase of at least one sundry article, through the passing of an indicia bearing payment card through the card reader, and to actuate the dispensing mechanism in response thereto; and operably connecting a cash box mechanism to the sundry article vending control device, for enabling a purchaser to alternatively complete a purchase of at least one sundry article using cash.

In the alternative method of vending, the vehicle-related product/service vending device is preferably one selected from the group consisting of a service station fuel pump, a self-service car wash control device, or a compressed air dispenser. The cash box mechanism may be configured to be operated by one of the group consisting of coins, bills, or coins and bills. The at least one type of sundry article may be one selected from the group consisting of towelettes, air gauges, gloves, tissues, or fuel additives. Alternatively, the at least one type of sundry article comprises a towelette, moistened with at least one agent selected from the group consisting of a cleaning agent, a deodorizing and/or scenting agent, or an antibacterial agent. Still further alternatively, the at least one type of sundry article may be one selected from the group consisting of vehicle-related non-fuel goods or non-vehicle-related goods.

BRIEF DESCRIPTION OF THE SEVERAL VIEWS OF THE DRAWING(S)

DETAILED DESCRIPTION OF THE INVENTION

Figure 1:
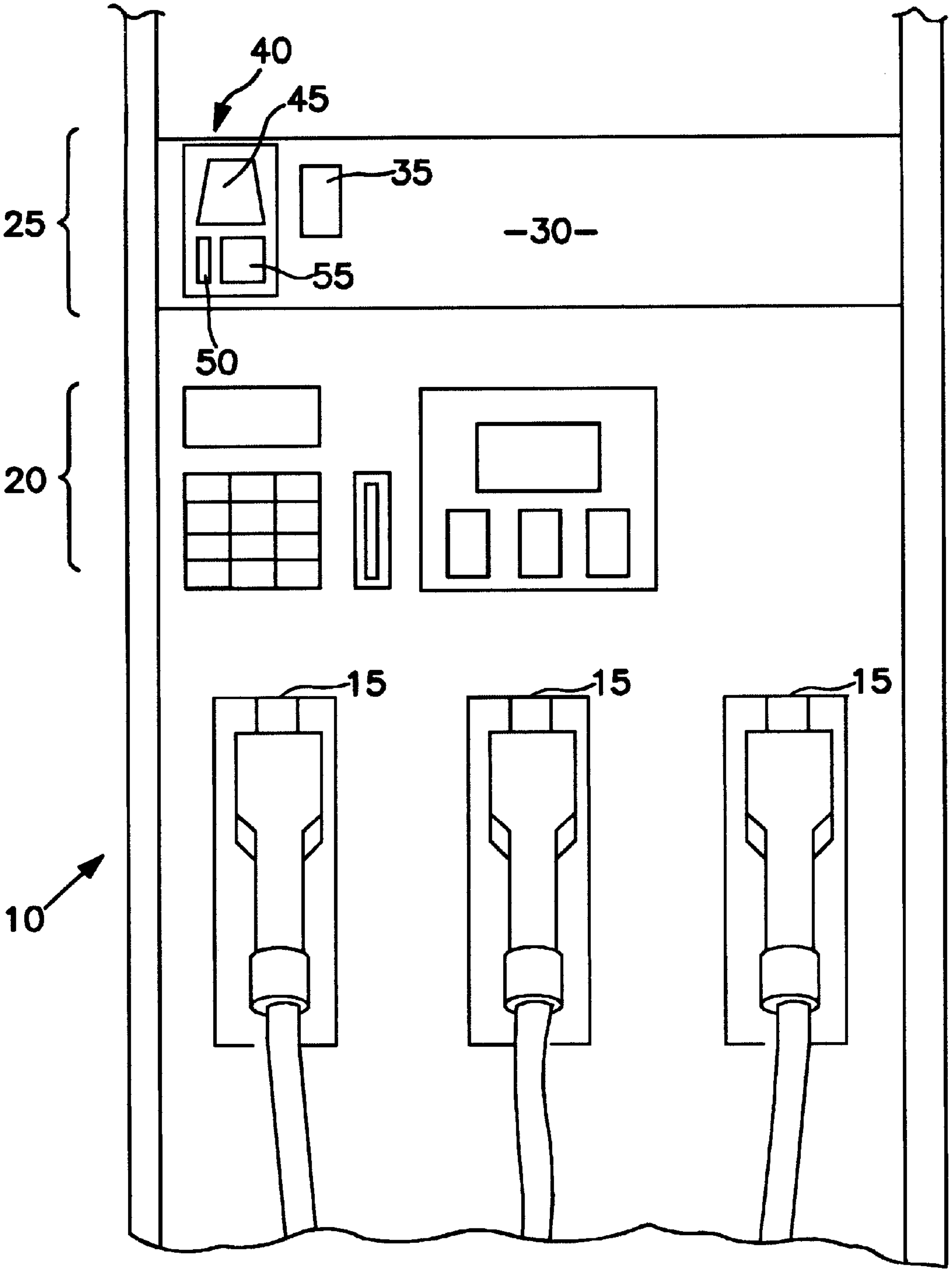
FIG. 1 is an illustration of a sundry article vending apparatus according to a first embodiment of the invention, configured in the environment of a service station fuel pump.

While this invention is susceptible of embodiment in many different forms, there are shown in the drawings and will be described in detail herein several specific embodiments, with the understanding that the present disclosure is to be considered an exemplification of the principles of the invention and is not intended to limit the invention to the embodiments illustrated.

While the specific examples described and illustrated herein, are shown in the environment of service station fuel pumps, it is to be understood that the principles of the present invention may also be applied to other types of vehicle-related automated and/or self-service product or service providing systems, without departing from the scope of the invention. Such alternative environments may include automated and/or self-service car wash systems, in which the customer enters payment and instructions through a control panel, or devices such as compressed air dispensers and the like, so long as the alternative environment incorporates possible payment, at the site of the vehicle-related product/service vending device providing the product or service, via an on-line billing system, and alternatively via cash, wherein the ordering, and the payment (except for cash) for the sundry articles are accomplished through the use of the existing keypad, card reader, etc. of the vehicle-related product/service vending device (and not, for example via an attendant at a location remote from the product or service providing device).

In addition, while the present disclosure describes, by way of the examples, the preferred vending of chiefly vehicle-related sundry items (cleansing towelettes, air gauges, non-fuel automotive liquids), the principles of the present invention also extend to the vending of less vehicle-focused sundry articles (e.g., non-perishable food items, toilet articles, etc.).

FIG. 1 illustrates the sundry article vending apparatus according to a first preferred embodiment of the invention. Pump housing 10 incorporates an otherwise conventional service station pump, which is configured to enable operation and payment, all by the customer, without requiring the customer to make payment within the service station enclosure itself.

Pump housing 10 includes pumping apparatus 15, and conventional keypad, alphanumeric display and card reader 20. Pump housing 10 also includes vending unit 25, which, in the embodiment of FIG. 1 is incorporated into the main housing 10.

For the purposes of this disclosure, the card reader is contemplated as being of either the magnetic or even optical type, for reading credit cards, debit cards or the like, which may bear either a magnetic strip or an optical bar code, or some other identifying, condensed information carrying indicia. Such cards may be configured to charge a credit account or debit a bank account, by telephonic communication with the relevant credit or banking institution. In addition, there are known to be prepaid novelty cards, which are recognized by some billing systems as having a preset intrinsic value, which is gradually depleted through successive purchases. All such different types of cards will be generically referred to herein as "indicia bearing payment cards".

Vending unit 25 is illustrated as occupying the uppermost region of the housing of a newly constructed pump. Vending unit 25 may also be an enclosure attached to the top of an existing unit, with the appropriate electrical connections being retrofitted to the existing electronics of the existing pump.

Vending unit 25 includes a storage area 30 for containing the sundry articles to be vended, in this embodiment towelettes, which may be dry, scented, or pre-moistened with a cleaning or antibacterial agent. Upon selecting a purchase transaction, the towelettes are dispensed through aperture 35. The mechanism for actually picking and physically moving the towelettes, sequentially, from the storage area 30 to the aperture 35, once payment has been made, may be of otherwise conventional configuration, and has been omitted from the illustrations as being known to one of ordinary skill in the art of dispenser apparatus.

The towelette vending apparatus may be configured for the vending of towelettes which may be plain, or which may have been pre-moistened, treated with a cleaning agent, a deodorizing and/or scenting agent, an antibacterial agent, or any combination thereof, and packaged in individual units, in foil or the like, as such towelettes, per se, are known in the art. Alternatively, the vending apparatus may contain a supply of towelettes, and separate supplies of one or more of the aforementioned treatment agents, which are applied to the towelette, immediately prior to the actual dispensing of the towelette, such as by sprays, rollers, dipping, etc. Apparatus for the "on-the-fly" treatment of towelettes are known, and so the specific details of such a mechanism have been omitted from the present specification.

Vending unit 25 also includes a cash box portion 40, which may include either a bill receptacle 45 or a coin slot 50, or both, and a coin return 55. The cash box portion may be configured, according to known techniques, to function strictly on an exact change basis, when being operated in a cash mode. Alternatively, the cash box may be configured to make change, in coin and/or in bills, as may be appropriate and desired.

The transaction of purchasing a towelette may be prompted by an advertisement or inquiry suitably programmed to be displayed on the alphanumeric display 20 of the pump housing 10. For example, after completion of a fuel purchase transaction using an indicia bearing payment card, the display screen typically asks if the customer desires a receipt. At the same time, or immediately after the customer has responded to that inquiry, for example, while the receipt is being printed, the control for the sundry article vending apparatus may cause to be shown in the screen, an inquiry such as "Would you like to purchase (or "Do you need") a (towelette, fuel additive, air gauge, etc.)?" In response to such inquiry, the customer may accept or refuse the offer to purchase such sundry articles, by appropriate keystrokes on the pump keypad. If the customer elects to make a purchase, subsequent instructions may be provided on the display (e.g., to swipe an indicia bearing payment card through the card reader, or to insert the appropriate coin or currency into the cash box 40).

If the customer elects to pay by indicia bearing payment card, the sundry article vending apparatus is electronically connected and programmed, to cooperate with the gas pump charge billing system, to communicate with the customer's bank or credit card service, via on-line communications, to charge the credit card, deduct the appropriate amount from the bank account of the customer, or deduct the amount from the prepaid card, as may be appropriate. The customer may alternatively chose to pay with cash for the vended sundry articles, even though the gasoline may have been paid for via charge card or debit card. Although payment may be in cash, the selection and "ordering" of the sundry articles is still performed via the keypad and display of the fuel pump.

The programming and electrical connections between the vending unit and the conventional pump controls may be provided by one of ordinary skill in the art, employing conventional design and programming techniques. Accordingly, such programming and electrical connections have been omitted from the present disclosure as being unnecessary for a complete understanding of the invention.

Figure 2:
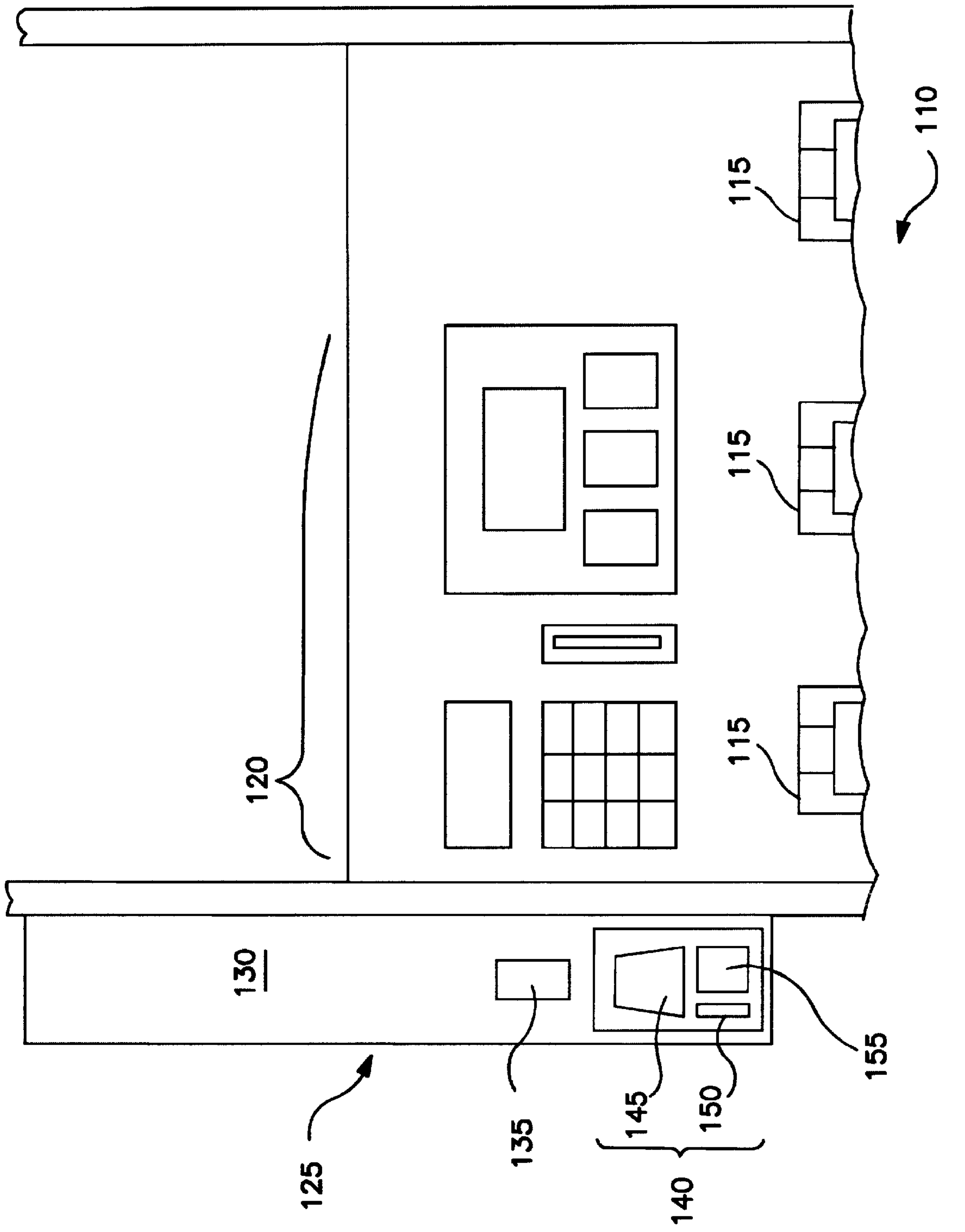
FIG. 2 is an illustration of a sundry article vending apparatus according to a second embodiment of the invention, configured in the environment of a service station fuel pump.

FIG. 2 illustrates an alternative embodiment of the invention, wherein pump housing 110 includes pumping apparatus 115, and conventional keypad, alphanumeric display and card reader 120. Pump housing 110 has attached to its side vending unit 125.

Vending unit 125 includes a storage area 130 for containing the sundry articles to be vended, also in this embodiments, towelettes. As in the embodiment of FIG. 1, the actual mechanism for the storage and dispensing of the towelettes may be of conventional nature and so a detailed discussion of that mechanism has been omitted. Upon the deposit of the correct amount of currency, or following the charging of the appropriate amount to the indicia bearing payment card, the towelettes are dispensed through aperture 135. The cash box portion may also be configured, according to known techniques, to function strictly on an exact change basis, when being operated in a cash mode. Alternatively, the cash box may be configured to make change, in coin and/or in bills, as may be appropriate and desired.

Vending unit 125 also includes a cash box portion 140, which may include either a bill receptacle 145 or a coin slot 150 or both, and a coin return 155. The operation of the sundry article vending apparatus in the embodiment of FIG. 2 is contemplated as having the same range of optional operations as the embodiment of FIG. 1.

Figure 3:
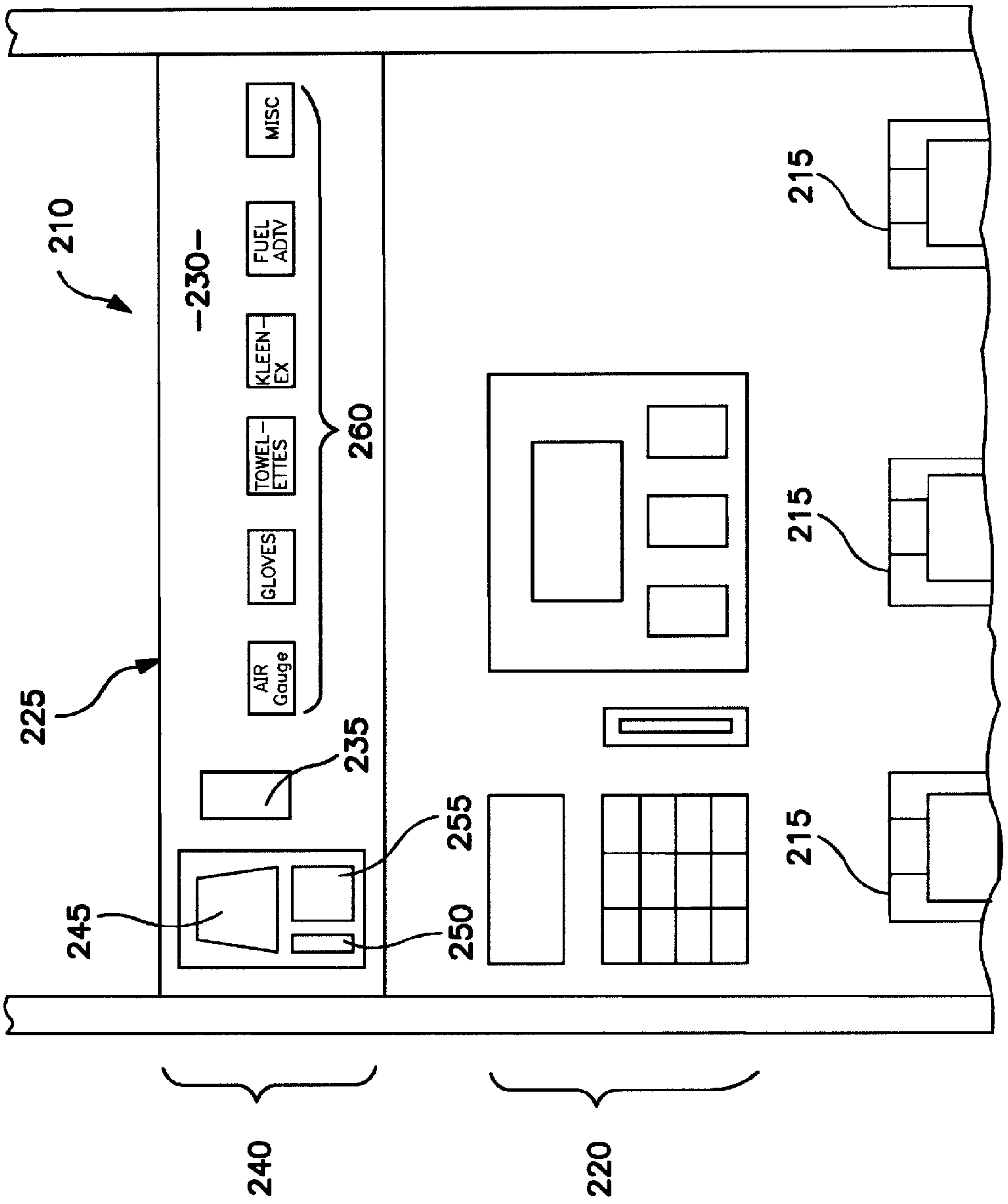
FIG. 3 is an illustration of a sundry article vending apparatus according to a third embodiment of the invention, configured in the environment of a service station fuel pump.

FIG. 3 illustrates an embodiment of the invention which is similar to the embodiment of FIG. 1, except that instead of being dedicated to a single type of sundry articles being vended, the embodiment of FIG. 3 is configured to present several different types of sundry articles.

Pump housing 210 includes pumping apparatus 215, and conventional keypad, alphanumeric display and card reader 220. Pump housing also includes vending unit 225, which may either be built into to a new pump housing, or comprise an enclosure mounted atop an existing pump housing.

Vending unit 225 includes a storage area 230 for containing the sundry articles to be vended. As in the embodiment of FIG. 1, the actual mechanism for the storage and dispensing of the sundry articles may be of conventional nature and so a detailed discussion of that mechanism has been omitted.

Vending unit 225 also includes a cash box portion 240, which may include either a bill receptacle 245 or a coin slot 250 or both, and a coin return 255. The operation of the sundry article vending apparatus in the embodiment of FIG. 3 is contemplated as having essentially the same range of optional operations as the embodiments of FIGS. 1 and 2, except that a plurality of selection buttons 260 are provided, for each of the different types of sundry articles, which may comprise such diverse items as an air gauge, disposable gloves, towelettes, tissues, fuel additive, etc. As in the previously described embodiments, the cash box portion may also be configured, according to known techniques, to function strictly on an exact change basis, when being operated in a cash mode. Alternatively, the cash box may be configured to make change, in coin and/or in bills, as may be appropriate and desired.

The foregoing description and drawings merely explain and illustrate the invention and the invention is not limited thereto except insofar as the appended claims are so limited, as those skilled in the art who have the disclosure before them to make modifications and variations therein without departing from the scope of the invention.

What is claimed is:

1. A sundry article vending apparatus, for the facilitated display and vending of at least one type of sundry article, at the location of a device for the vending of a vehicle-related product and/or service, to enable a purchaser to complete a purchase transaction of at least one of the sundry articles, at said vehicle-related product/service vending device, wherein the vehicle-related product/service vending device is provided with a payment device including a keypad, an alphanumeric display, a card reader, and a vehicle-related product/service vending control device having suitable connections to an automated billing system, the sundry article vending apparatus comprising:

a storage device, operably and physically integrated with a vehicle-related product/service device housing configured for facilitating delivery of at least one vehicle related fluid or service, and adjacent said housing, said storage device and said vehicle-related product/service device housing forming a single integrated structure, the storage device being operably configured to contain a quantity of at least one type of sundry articles different from said at least one vehicle-related fluid or service;

said storage device further including a dispensing mechanism operably configured, upon actuation, for delivering at least one of said sundry articles from the storage device to a dispensing aperture;

a sundry article vending control device, operably connected to the dispensing mechanism, and further operably connectable to a vehicle-related product/service vending control device, the sundry article vending control device operably connected to a vehicle-related product/service vending control device, to receive order instructions from a purchaser, entered by keystrokes on the payment device keypad of the vehicle-related product/service vending device, the sundry article vending control device further being operably configured to accept payment for the purchase of at least one sundry article, through the passing of an indicia bearing payment card through the card reader and to actuate the dispensing mechanism in response thereto, through interactive accessing of customer data not contained on the indicia bearing payment card from a source of data at a remote position relative to the indicia bearing payment card;

said sundry article vending control device and said vehicle-related product service vending control device sharing the same payment device integrated therebetween;

a cash box mechanism, operably connected to the sundry article vending control device, for enabling a purchaser to alternatively complete a purchase of at least one sundry article using cash; and means for inquiring of a user of the device for the vending of a vehicle-related product and/or service, whether the user wishes to purchase at least one of said sundry articles.

2. The sundry article vending apparatus according to claim 1, wherein the vehicle-related product/service vending device is one selected from the group consisting of a service station fuel pump, a self-service car wash control device, a compressed air dispenser.

3. The sundry article vending apparatus according to claim 1, wherein the cash box mechanism is configured to be operated by one of the group consisting of coins, bills, coins and bills.

4. The sundry article vending apparatus according to claim 1, wherein the at least one type of sundry article is selected from the group consisting of towelettes, air gauges, gloves, tissues, fuel additives.

5. The sundry article vending apparatus according to claim 1, wherein the at least one type of sundry article comprises a towelette, moistened with at least one agent selected from the group consisting of a cleaning agent, a deodorizing and/or scenting agent, an antibacterial agent.

6. The sundry article vending apparatus according to claim 1, wherein the at least one type of sundry article is selected from the group consisting of vehicle-related non-fuel goods, non-vehicle-related goods.

7. The sundry article vending apparatus according to claim 1, wherein the means for inquiring of a user of the device for the vending of a vehicle-related product and/or service, whether the user wishes to purchase at least one of said sundry articles further comprises:

means for displaying on the alphanumeric display an inquiry to the user relating to the at least one sundry article, requiring a response by the user.

8. The sundry article vending apparatus according to claim 1, wherein the means for inquiring of a user of the device for the vending of a vehicle-related product and/or service, to purchase at least one of said sundry articles comprises:

means for prompting the user of the device for the vending of a vehicle-related product and/or service, to purchase at least one of said sundry articles, the means for prompting being actuated to present the prompt no earlier than the initiation of the dispensing of the vehicle-related product or service.

9. A combination vehicle-related product/service vending device and integrated sundry article vending apparatus, for the facilitated display and vending of at least one type of sundry articles other than fuel, to enable a purchaser to complete a purchase transaction of at least one of the sundry articles, at the site of the vehicle-related product/service vending device, the combination vehicle-related product/service vending device and integrated sundry article vending apparatus comprising:

a housing;

a device disposed within the housing for providing a vehicle-related product/service configured for facilitating delivery of at least one vehicle related fluid or service;

a payment device including a keypad, an alphanumeric display, a card reader, and a vehicle-related product/service vending control device having suitable connections to an automated billing system;

a storage device, operably and physically integrated with and disposed within the housing in which the device for providing a vehicle-related product/service is disposed, and operably configured to contain a quantity of at least one type of sundry articles different from said at least one vehicle related fluid or service;

said storage device and said vehicle-related product/service device housing forming a single integrated structure, a sundry article dispensing mechanism operably configured, upon actuation, for delivering at least one of said sundry articles from the storage device to a dispensing aperture;

a sundry article vending control device, operably connected to the sundry article dispensing mechanism, and further operably connected to the vehicle-related product/service vending control device, the sundry article vending control device being operably configured, to receive order instructions from a purchaser, entered by keystrokes on the payment device keypad of the vehicle-related product/service vending device, the sundry article vending control device further being operably configured to accept payment for the purchase of at least one sundry article, through the passing of an indicia bearing payment card through the card reader, and to actuate the dispensing mechanism in response thereto, through interactive accessing of customer data not contained on the indicia bearing payment card from a source of data at a remote position relative to the indicia bearing payment card;

said sundry article vending control device and said vehicle-related product service vending control device sharing the same payment device integrated therebetween;

a cash box mechanism, operably connected to the sundry article vending control device, for enabling a purchaser to alternatively complete a purchase of at least one sundry article using cash; and means for inquiring of a user of the device for the vending of a vehicle-related product and/or service, whether the user wishes to purchase at least one of said sundry articles.

10. The sundry article vending apparatus according to claim 9, wherein the at least one type of sundry article is selected from the group consisting of towelettes, air gauges, gloves, tissues, fuel additives.

11. The sundry article vending apparatus according to claim 9, wherein the at least one type of sundry article comprises a towelette, moistened with at least one agent selected from the group consisting of a cleaning agent, a deodorizing and/or scenting agent, an antibacterial agent.

12. The sundry article vending apparatus according to claim 9, wherein the at least one type of sundry article is selected from the group consisting of vehicle-related non-fuel goods, non-vehicle-related goods.

13. The sundry article vending apparatus according to claim 9, wherein the vehicle-related product/service vending device is one selected from the group consisting of a service station fuel pump, a self-service car wash control device, a compressed air dispenser.

14. The sundry article vending apparatus according to claim 9, wherein the cash box mechanism is configured to be operated by one of the group consisting of coins, bills, coins and bills.

15. The combination vehicle-related product/service vending device and integrated sundry article vending apparatus according to claim 9, wherein the means for inquiring of a user of the device for the vending of a vehicle-related product and/or service, whether the user wishes to purchase at least one of said sundry articles further comprises:

means for displaying on the alphanumeric display an inquiry to the user relating to the at least one sundry article, requiring a response by the user.

16. The sundry article vending apparatus according to claim 9, wherein the means for inquiring of a user of the device for the vending of a vehicle-related product and/or service, to purchase at least one of said sundry articles comprises:

means for prompting the user of the device for the vending of a vehicle-related product and/or service, to purchase at least one of said sundry articles, the means for prompting being actuated to present the prompt no earlier than the initiation of the dispensing of the vehicle-related product or service.

17. A method of vending sundry articles from a vehicle-related product/service vending device, comprising the steps of:

providing a sundry article vending apparatus, for the facilitated display and vending of at least one type of sundry articles other than fuel, at a vehicle-related product/service vending device, to enable a purchaser to complete a purchase transaction of at least one of the sundry articles, at the vehicle-related product/service vending device, wherein the vehicle-related product/service vending device is provided with a payment device including a keypad, an alphanumeric display, a card reader, and a vehicle-related product/service vending control device having suitable connections to an automated billing system, the step of providing a sundry article vending apparatus further comprising the steps of:

providing a storage device, in operable and physical integration with a vehicle-related product/service vending device housing configured for facilitating delivery of at least one vehicle related fluid or service and adjacent said housing, said storage device and said vehicle-related product/service device housing forming a single integrated structure, operably configuring the storage device to contain a quantity of at least one type of sundry articles different from said at least one vehicle-related fluid or service;

including in the storage device a dispensing mechanism operably configured to, upon actuation, deliver at least one of said sundry articles from the storage device to a dispensing aperture;

providing and operably connecting a sundry article vending control device to the dispensing mechanism, and further operably connecting the sundry article vending control device to a vehicle-related product/service vending control device, operably configuring the sundry article vending control device, upon connection to a vehicle-related product/service vending control device, to receive order instructions from a purchaser, entered by keystrokes on the payment device keypad of the vehicle-related product/service vending device, further operably configuring the sundry article vending control device, upon connection to a vehicle-related product/service vending control device, to accept payment for the purchase of at least one sundry article, through the passing of an indicia bearing payment card through the card reader and to actuate the dispensing mechanism in response thereto, through interactive accessing of customer data not contained on the indicia bearing payment card from a source of data at a remote position relative to the indicia bearing payment card;

said sundry article vending control device and said vehicle-related product service vending control device sharing the same payment device integrated therebetween;

providing and operably connecting a cash box mechanism, to the sundry article vending control device, for enabling a purchaser to alternatively complete a purchase of at least one sundry article using cash; and inquiring of a user of the device for the vending of a vehicle-related product and/or service, whether the user wishes to purchase at least one of said sundry articles.

18. The method of vending according to claim 17, wherein the vehicle-related product/service vending device is one selected from the group consisting of a service station fuel pump, a self-service car wash control device, a compressed air dispenser.

19. The method of vending according to claim 17, wherein the cash box mechanism is configured to be operated by one of the group consisting of coins, bills, coins and bills.

20. The method of vending according to claim 17, wherein the at least one type of sundry article is selected from the group consisting of towelettes, air gauges, gloves, tissues, fuel additives.

21. The method of vending according to claim 17, wherein the at least one type of sundry article comprises a towelette, moistened with at least one agent selected from the group consisting of a cleaning agent, a deodorizing and/or scenting agent, an antibacterial agent.

22. The method of vending according to claim 17, wherein the at least one type of sundry article is selected from the group consisting of vehicle-related non-fuel goods, non-vehicle-related goods.

23. The method of vending sundry articles from a vehicle-related product/service vending device according to claim 17, wherein the step of inquiring of a user of the device for the vending of a vehicle-related product and/or service, whether the user wishes to purchase at least one of said sundry articles further comprises the step of:

displaying on the alphanumeric display an inquiry to the user relating to the at least one sundry article, requiring a response by the user.

24. The method of vending sundry articles from a vehicle-related product/service vending device according to claim 17, wherein the step of inquiring of a user of the device for the vending of a vehicle-related product and/or service, whether the user wishes to purchase at least one of said sundry articles, further comprises the step of:

prompting the user of the device for the vending of a vehicle-related product and/or service, to purchase at least one of said sundry articles, the prompting being actuated to present the prompt no earlier than the initiation of the dispensing of the vehicle-related product or service.

25. A method for vending sundry articles from a combination vehicle-related product/service vending device and integrated sundry article vending apparatus, for the facilitated display and vending of at least one type of sundry articles other than fuel, to enable a purchaser to complete a purchase transaction of at least one of the sundry articles, at the vehicle-related product/service vending device, the method of vending sundry articles from a combination vehicle-related product/service vending device and integrated sundry article vending apparatus comprising the steps of:

providing a housing;

disposing a vehicle-related product/service vending mechanism within the housing configured for facilitating delivery of at least one vehicle related fluid;

disposing a payment device including a keypad, an alphanumeric display, a card reader, and a vehicle-related product/service vending control device having suitable connections to an automated billing system, within the housing;

disposing a storage device in operable and physical integration with the housing in which the device for providing a vehicle-related product/service is disposed, and operably configuring the storage device to contain a quantity of at least one type of sundry articles different from said at least one vehicle related fluid or service, said storage device and said vehicle-related product/service device housing forming a single integrated structure;

operably configuring a sundry article dispensing mechanism to, upon actuation, deliver at least one of said sundry articles from the storage device to a dispensing aperture;

operably connecting a sundry article vending control device to the sundry article dispensing mechanism, and further operably connecting the sundry article vending control device to the vehicle-related product/service vending control device, operably configuring the sundry article vending control device to receive order instructions from a purchaser, entered by keystrokes on the keypad of the vehicle-related product/service vending device, further operably configuring the sundry article vending control device to accept payment for the purchase of at least one sundry article, through the passing of an indicia bearing payment card through the card reader, and to actuate the dispensing mechanism in response thereto, through interactive accessing of customer data not contained on the indicia bearing payment card from a source of data at a remote position relative to the indicia bearing payment card;

said sundry article vending control device and said vehicle-related product service vending control device sharing the same payment device integrated therebetween;

operably connecting a cash box mechanism to the sundry article vending control device, for enabling a purchaser to alternatively complete a purchase of at least one sundry article using cash; and inquiring of a user of the device for the vending of a vehicle-related product and/or service, whether the user wishes to purchase at least one of said sundry articles.

26. The method of vending according to claim 25, wherein the vehicle-related product/service vending device is one selected from the group consisting of a service station fuel pump, a self-service car wash control device, a compressed air dispenser.

27. The method of vending according to claim 25, wherein the cash box mechanism is configured to be operated by one of the group consisting of coins, bills, coins and bills.

28. The method of vending according to claim 25, wherein the at least one type of sundry article is selected from the group consisting of towelettes, air gauges, gloves, tissues, fuel additives.

29. The method of vending according to claim 25, wherein the at least one type of sundry article comprises a towelette, moistened with at least one agent selected from the group consisting of a cleaning agent, a deodorizing and/or scenting agent, an antibacterial agent.

30. The method of vending according to claim 25, wherein the at least one type of sundry article is selected from the group consisting of vehicle-related non-fuel goods, non-vehicle-related goods.

31. The method for vending sundry articles from a combination vehicle-related product/service vending device and integrated sundry article vending apparatus, according to claim 25, wherein the step of inquiring of the device for the vending of a vehicle-related product and/or service, whether the user wishes to purchase at least one of said sundry articles further comprises the step of:

displaying on the alphanumeric display an inquiry to the user relating to the at least one sundry article, requiring a response by the user.

32. The method of vending sundry articles from a vehicle-related product/service vending device according to claim 25, wherein the step of inquiring of a user of the device for the vending of a vehicle-related product and/or service, whether the user wishes to purchase at least one of said sundry articles, further comprises the step of:

prompting the user of the device for the vending of a vehicle-related product and/or service, to purchase at least one of said sundry articles, the prompting being actuated to present the prompt no earlier than the initiation of the dispensing of the vehicle-related product or service.

* * * * *